United States Patent [19]  [11] 4,171,181
Chelin  [45] Oct. 16, 1979

[54] LATERAL SUPPORT DEVICE FOR OUTER MAST UPRIGHT

[75] Inventor: Charles R. Chelin, Peoria, Ill.

[73] Assignee: Towmotor Corporation, Mentor, Ohio

[21] Appl. No.: 765,518

[22] Filed: Feb. 4, 1977

[51] Int. Cl.$^2$ ............................................. B66F 9/22
[52] U.S. Cl. ..................................... 414/636; 414/634
[58] Field of Search ........................ 214/660, 670-674, 214/77 P, 505, 700, 701 R, 701 P, 77 R; 308/DIG. 8, 3 R, 5 R; 212/144, 55, 59 R, 8 R, 8 A; 298/17 R; 414/628, 629, 634-636

[56] References Cited

U.S. PATENT DOCUMENTS

| 1,509,875 | 9/1924 | Rasnick et al. | 298/17 R |
| 3,047,161 | 7/1962 | Thacker | 212/59 R |
| 3,710,967 | 1/1973 | Stoytchev et al. | 214/674 |

Primary Examiner—Robert G. Sheridan
Attorney, Agent, or Firm—Phillips, Moore, Weissenberger, Lempio & Majestic

[57] ABSTRACT

The invention is concerned with an improvement in a lift truck having a mast assembly, a frame and tilt motor apparatus for tilting the mast assembly forwardly and rearwardly relative to the frame. Particularly the invention is concerned with a lateral support device for the mast assembly. The lateral support device comprises a pair of guides each affixed to a lateral outer surface of the mast assembly and a pair of bearing devices affixed to the frame, each in position to slidably receive a respective one of the guides on operation of the tilt motor apparatus to tilt a top portion of the mast assembly rearwardly to thereby bearingly hold the mast assembly snugly between the pair of bearing devices whereby during movement of the lift truck lateral motion of the mast assembly is restricted when the guides are held between the bearing devices.

13 Claims, 4 Drawing Figures

U.S. Patent  Oct. 16, 1979  4,171,181
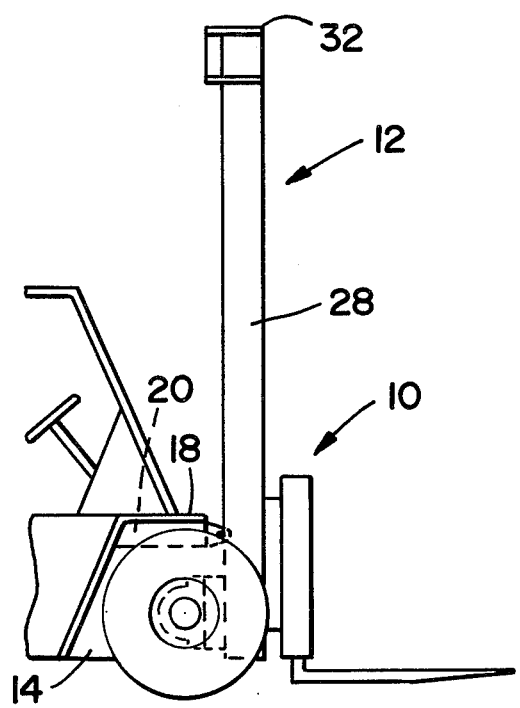
FIG_1
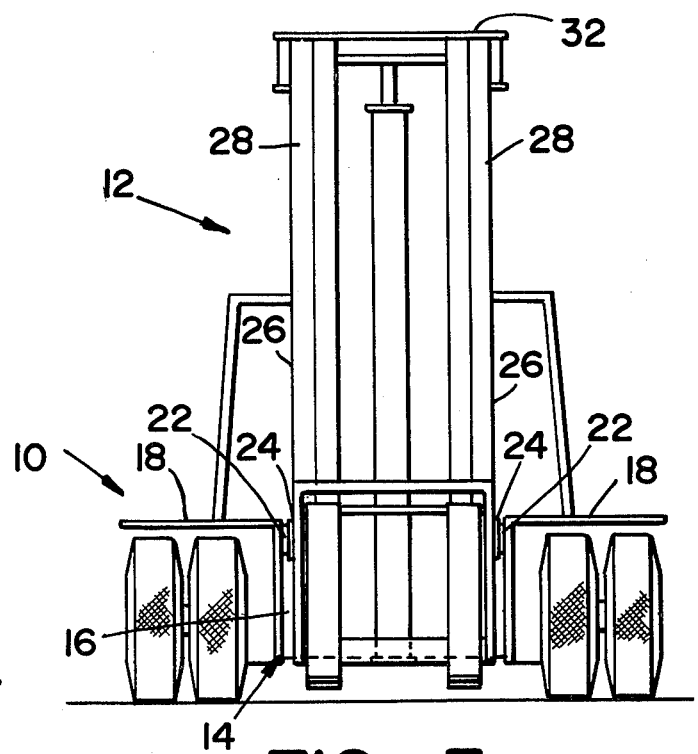
FIG_3
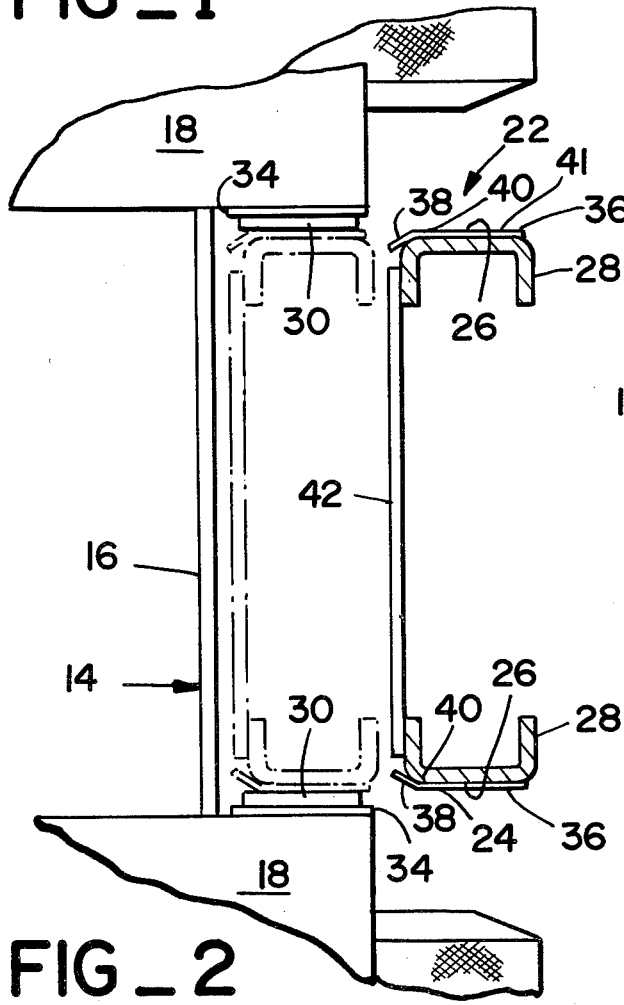
FIG_2
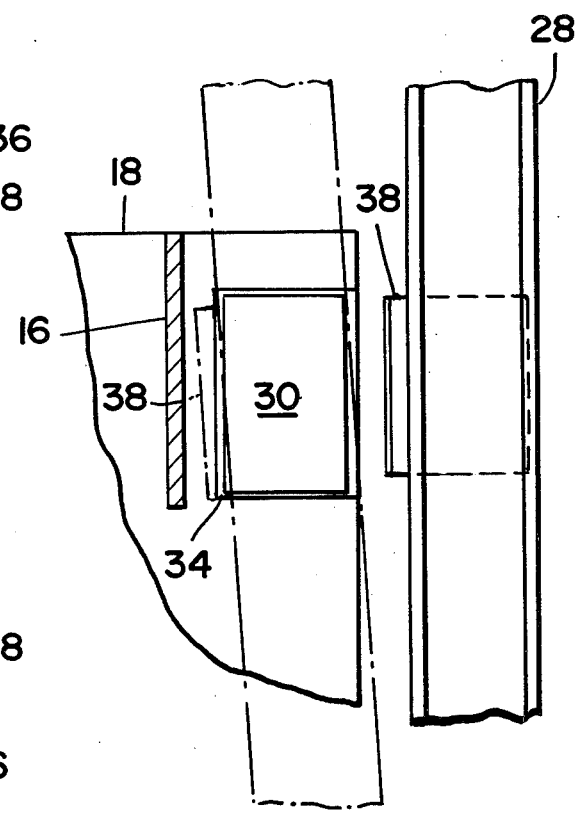
FIG_4

LATERAL SUPPORT DEVICE FOR OUTER MAST UPRIGHT

BACKGROUND OF THE INVENTION

1. Field of the Invention

The invention is concerned with a lift truck and more particularly with particular apparatus which allows a lift truck to be transported and which assures that the mast assembly of the lift truck is protected from damage when the lift truck travels over rough terrain.

2. Prior Art

Lift trucks having mast assemblies mounted to a frame and motor means such as a hydraulic cylinder or cylinders for tilting the mast assembly forwardly and rearwardly relative to the frame are of course well known to the prior art. A particular problem which has existed with such lift trucks has been that when the lift truck is operating over rough terrain or driven at relatively high speeds along somewhat bumpy roads, the mast assembly is subjected to high stresses at its pivot and cylinder anchor points, especially when carrying an unequally distributed load thus resulting in increased wear and possible damage to the mast and its jointed parts. The present invention provide a unique and effective solution to this problem which prevents high twisting stresses from being applied to the cylinders and the anchor joint in an inexpensive manner and in a manner which can be adapted for use in existing lift trucks.

SUMMARY OF THE INVENTION

The present invention is directed to overcoming one or more of the problems as set forth above.

According to the present invention there is provided a lift truck lateral support device for a mast assembly pivotally mounted adjacent a bottom thereof to a frame, the mast assembly having a pair of spaced apart outer mast members each having a lateral outer surface and tilt motor means for tilting the mast assembly forwardly and rearwardly relative to the frame. The lateral support device comprises a pair of generally parallel facing surfaces on said frame, each facing surface being adjacent and generally parallel to a respective lateral outer surface of a respective one of the pair of outer mast members. A pair of bearing means are a spaced distance from the pivotal mounting of the mast assembly to the frame, each of the bearing means being attached to a respective one of the facing surfaces and the lateral outer surfaces, the bearing means being positioned to slidably receive a respective other of the facing surfaces and the lateral outer surfaces, on operation of the tilt motor means to tilt the mast assembly rearwardly to thereby bearingly hold the mast assembly between the pair of facing surfaces and restrict lateral motion thereof. The result is that lateral or twisting loads are removed from the mast support joints and tilt cylinders.

An apparatus as set out immediately above solves the serious problem in roading lift trucks mentioned above.

BRIEF DESCRIPTION OF THE DRAWING

The invention will be better understood by reference to the figures of the drawing wherein like numbers denote like parts throughout and wherein:

FIG. 1 illustrates in side view a lift truck having tilt motors and including a lateral support device of the present invention;

FIG. 2 illustrates in top view, a lateral support device in accordance with the present invention and its attachment to a lift truck;

FIG. 3 illustrates in front view a lift truck having a lateral support device in accordance with the present invention; and FIG. 4 illustrates a detail in a lateral support device of the present invention.

DETAILED DESCRIPTION OF THE PREFERRED EMBODIMENT

Adverting primarily to FIGS. 1 and 3, there is illustrated therein a lift truck 10 having a mast assembly 12 at a forward end thereof and a frame 14 which includes a front bulk head 16 and fenders 18. A hydraulic cylinder 20 serves as tilt motor means for tilting the mast assembly 12 forwardly and rearwardly relative to the frame 14. Each of the aforementioned structures are well known in the lift truck art. The present invention is concerned with a lateral support device 22 for the mast assembly 12. The lateral support device 22 includes a pair of guide means, in the embodiment illustrated a pair of guide ramps 24. Each of the guide ramps 24 is affixed to a lateral outer surface 26 of the mast assembly 12 and more particularly is affixed to an outer mast member 28 of the mast assembly 12.

Referring primarily to FIGS. 2 and 4, a pair of bearing means, in the embodiment illustrated a pair of bearings 30 in the form of plates are affixed to the frame 14 and most generally to the fenders 18 in position to slidably receive the guide ramps 24. The guide ramps 24 are received by the bearings 30 on operation of the hydraulic cylinder 20 to tilt a top portion 32 of the mast assembly 12 rearwardly. Thereby the bearings 30 serve to bearingly hold the mast assembly 12 snugly between the pair of bearings 30 whereby during movement of the lift truck 10, lateral motion of the mast assembly 12 is restricted so long as the guide ramps 24 are held by the bearings 30. Shim means such as a pair of shims 34 are generally positioned between the bearings 30 and the frame 14, most particularly the fenders 18. Different sizes of shim means 34 can be positioned between the respective bearings 30 and the respective fenders 18 to provide for adjustment and for maintaining the desirable amount of force against the mast assembly 12 and more particularly against the outer mast members 28. Preferably the bearings 30 are made of a bearing material such as brass, bronze or, most preferably of an ultra high molecular weight polyolefin polymer.

A low friction and relatively high molecular weight polyolefin polymer may be used as the material from which the bearings 30 are formulated, since its abrasive resistance is greatly increased at the higher molecular weights. Preferably the bearing material is selected from the ultra high molecular weight (UHMW) polyolefin polymer material group consisting of polyethylene, polypropylene and co-polymers thereof. In carrying out the present invention such polymers should have a molecular weight of at least about 1.7 million in order to obtain sufficient wear resistance for the rough usage contemplated. More preferably, such polymers will have a molecular weight of more than about 3.0 million. The polymers can also advantageously contain various fillers, e.g., glass beads, glass fibers, graphite and the like to improve stiffness, cold flow, and heat deflection. A particularly useful non-halogenated polymer having the aforementioned physical characteristics comprises an ultra high molecular weight polyethylene having a molecular weight of at least approximately 3.5 million. Such polymers are commercially available, for example, from such suppliers as Hercules, Inc., and American Hoechst Corp. A very complete description of such materials can be found in Materials Engineering the issue of September 1971, at pages 34-39.

Pursuant to the present invention, the increased abrasion resistance and relatively low coefficient of friction due to the relatively high molecular weight of the replaceable polyolefin polymer bearing material markedly improves the service life thereof. This is in marked contrast to conventional polytetrafluoroethylene coatings which have molecular weights in the range of approximately 20,000 and which wear so significantly that they are generally considered impractical. Further, an ultra high molecular weight material bearing 30 when used in the present invention is sufficiently elastic that it exhibits superior impact resistance and elastic recovery, or an ability to return to its original state after being highly locally deformed.

Each of the guide ramps 24 will generally comprise an elongated rectangular portion 36 against the lateral outer surface 26 of the mast assembly 12 and a bent portion 38 which proceeds from a truck facing end 40 of the rectangular portion 36 towards the lift truck 10. Each of the bent portions 38 of each of the guide ramps 24 proceeds generally towards the other of the bent portions 38 of the other of the guide ramps 24. Thus, the bent portions 38 of the guide ramps 24 serve to provide for gradual contact between the bearings 30 and the guide ramps 24 and hence the mast assembly 12 during rearward tilt of the mast assembly 12 under the impetus of the hydraulic cylinder 20.

A cross-brace 42 is provided for tying together the pair of outer mast members 28 of the mast assembly 12 adjacent the guide ramps 24 and likewise adjacent the bearings 30. The cross-brace 42 serves to supply additional rigidity to the mast assembly 12.

It will be clear that when a lift truck 10 is to be driven over rough ground or the like, the hydraulic cylinder 20 can be operated to tilt the mast assembly 12 backwardly whereby the guide ramps 24 will be guided by the bent portions 38 thereof into being held between the bearings 30 and thus being held between the fenders 18 of the frame 14. Thus, during operation over rough ground, the mast assembly 12 is restricted in its motion so as to prevent damage thereto. The high stresses caused by unequally distributed load on the carriage forks during roading which leads to high pin and anchor stresses is thus significantly reduced leading to longer wear of these parts and a significant reduction in down time for repairs.

While the invention has been described in connection with specific embodiments thereof, it will be understood that it is capable of further modification, and this application is intended to cover any variations, uses or adaptions of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The embodiments of the invention in which an exclusive property or privilege is claimed are defined as follows:

1. In a lift truck having a mast assembly pivotally mounted adjacent a bottom thereof to a frame, said mast assembly having a pair of spaced apart outer mast members each having a lateral outer surface, and tilt motor means for tilting said mast assembly forwardly and rearwardly relative to said frame, a lateral support device for said mast assembly, comprising:
   a pair of guide means each affixed to a respective one of said laterally outer surfaces and said frame a spaced distance from the pivotal mounting of the mast assembly to the frame; and
   a pair of bearing means affixed to a respective other of said lateral outer surfaces and said frame, each of said bearing means being in position to slideably receive a respective one of said guide means on operation of said tilt motor means to tilt said mast assembly rearwardly to thereby bearingly hold said mast assembly steadily between said pair of bearing means whereby during operation of said lift truck lateral motion of said mast assembly is restricted when said guide means is held by said bearing means.

2. A lateral support device as in claim 1, including shim means between said bearing means and said frame.

3. A lateral support device as in claim 1, wherein said bearing means comprises an ultra high molecular weight polyolefin polymer.

4. A lateral support device as in claim 1, including:
   a cross-brace tying together a pair of outer mast members of said mast assembly adjacent said guide means and said bearing means.

5. A lateral support device as in claim 1, wherein each of said guide means comprises a guide ramp.

6. In a lift truck having a mast assembly pivotally mounted adjacent a bottom thereof to a frame, said mast assembly having a pair of spaced apart outer mast members, and tilt motor means for tilting said mast assembly forwardly and rearwardly relative to said frame, a lateral support device for said mast assembly, comprising:
   a pair of guide means each affixed to a lateral outer surface of said mast assembly, each of the said guide means having a guide ramp having an elongated rectangular portion against said lateral outer surface of said mast assembly and a bent portion proceeding from a truck facing end of said rectangular portion towards said lift truck, each of said bent portions of each of said guide ramps proceeding generally towards the other of said bent portions of the other of said guide ramps; and
   a pair of bearing means affixed to said frame a spaced distance from the pivotal mounting of the mast assembly to the frame, each of said bearing means being in position to slideably receive a respective one of said guide means on operation of said tilt motor means to tilt said mast assembly rearwardly to thereby bearingly hold mast assembly.

7. A lateral support device as in claim 6, including:
   a cross-brace tying together a pair of outer mast members of said mast assembly adjacent said guide means and said bearing means.

8. A lateral support device as in claim 7, including shim means between said bearing means and said frame.

9. A lateral support device as in claim 8, wherein said bearing means comprises an ultra high molecular weight polyolefin polymer.

10. In a lift truck having a mast assembly pivotally mounted adjacent a bottom thereof to a frame, said mast assembly having a pair of spaced apart outer mast members each having a lateral outer surface, and tilt motor means for tilting said mast assembly forwardly and rearwardly relative to said frame, a lateral support device for said mast assembly, comprising:

a pair of generally parallel facing surfaces on said frame, each facing surface being adjacent and generally parallel to a respective lateral outer surface of a respective one of said pair of outer mast members; and a pair of bearing means a spaced distance from the pivotal mounting of the mast assembly to the frame, each of said bearing means being attached to a respective one of said facing surfaces and said lateral outer surfaces, said bearing means being positioned to slidingly receive a respective other of said facing surfaces and said lateral outer surfaces, on operation of said tilt motor means to tilt said mast assembly rearwardly to thereby bearingly hold said mast assembly between said pair of facing surfaces and restrict lateral motion thereof.

11. A lateral support device as in claim 10, further including:

a pair of guide ramps each affixed to said respective other of said facing surfaces and said lateral outer surfaces.

12. A lateral support device as in claim 11, wherein each of said guide ramps has an elongated rectangular portion, against said respective other of said facing surfaces and said lateral outer surfaces, and a bent portion, proceeding from a truck facing end of said rectangular portion toward said lift truck, each of said bent portions of each of said guide ramps proceeding generally towards the other of said bent portions of the other of said guide ramps.

13. A lateral support device as in claim 11, wherein said bearing means are on said facing surfaces and said guide ramps are on said lateral outer surfaces.

* * * * *